(12) United States Patent
Zver et al.

(10) Patent No.: US 10,970,500 B2
(45) Date of Patent: Apr. 6, 2021

(54) SCANNING DEVICE AND METHOD FOR USE IN AN AUTOMATED ANALYSER

(71) Applicant: STRATEC Biomedical AG, Birkenfeld (DE)

(72) Inventors: Martin Zver, Kämpfelbach (DE); Michael Burkart, Waldbronn (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 16/128,589

(22) Filed: Sep. 12, 2018

(65) Prior Publication Data

US 2019/0087616 A1    Mar. 21, 2019

(30) Foreign Application Priority Data

Sep. 20, 2017  (GB) .................................. 1715182.0

(51) Int. Cl.
| G06K 7/10 | (2006.01) |
| G01N 35/02 | (2006.01) |
| G01N 35/00 | (2006.01) |
| G06K 7/14 | (2006.01) |
| G02B 7/04 | (2021.01) |

(52) U.S. Cl.
CPC ... *G06K 7/10722* (2013.01); *G01N 35/00732* (2013.01); *G01N 35/026* (2013.01); *G06K 7/10881* (2013.01); *G06K 7/1413* (2013.01); *G02B 7/04* (2013.01); *G06K 2007/10524* (2013.01)

(58) Field of Classification Search
CPC ... G01N 35/00732; G01N 2035/00752; G06K 7/10861; G06K 7/10702; G06K 7/10722
See application file for complete search history.

(56) References Cited

U.S. PATENT DOCUMENTS

| 4,401,288 | A | * | 8/1983 | Thompson | ............ | G02B 7/1825 |
| | | | | | | 248/274.1 |
| 4,918,306 | A | * | 4/1990 | Saito | ....................... | G02B 26/10 |
| | | | | | | 250/235 |
| 5,555,122 | A | * | 9/1996 | Takada | ................. | G02B 26/105 |
| | | | | | | 347/259 |
| 5,808,774 | A | * | 9/1998 | Kawabata | ............ | G02B 26/124 |
| | | | | | | 359/205.1 |
| 6,819,409 | B1 | * | 11/2004 | Tompkin | ............ | G06K 7/10722 |
| | | | | | | 235/449 |
| 7,369,287 | B2 | * | 5/2008 | Tahk | .................... | G02B 7/1821 |
| | | | | | | 359/196.1 |
| 8,077,371 | B2 | * | 12/2011 | Shiraishi | .............. | G02B 26/124 |
| | | | | | | 359/219.2 |
| 8,089,675 | B2 | * | 1/2012 | Shiraishi | .............. | G02B 26/124 |
| | | | | | | 359/205.1 |
| 8,496,173 | B2 | | 7/2013 | Anselment et al. | | |
| 10,146,973 | B2 | * | 12/2018 | Hagen | .................. | G06K 7/1413 |

(Continued)

FOREIGN PATENT DOCUMENTS

| GB | 2537887 | 11/2016 |
| WO | 2016164473 A1 | 10/2016 |

*Primary Examiner* — Christopher Stanford

(74) *Attorney, Agent, or Firm* — 24IP Law Group USA, PLLC; Timothy Dewitt

(57) ABSTRACT

A scanning method with simple mechanics for use in an automated analyser to scan objects or codes on objects. The invention enables one to move a scanning unit comprising a camera and two deflection mirrors and to set two different focus levels with one and the same drive unit.

7 Claims, 3 Drawing Sheets

(56) References Cited

U.S. PATENT DOCUMENTS

2001/0048029 A1* 12/2001 Kitagawa ............ G06K 7/10683
235/462.43
2013/0070349 A1* 3/2013 Takahashi ................ G02B 5/04
359/730

* cited by examiner

SCANNING DEVICE AND METHOD FOR USE IN AN AUTOMATED ANALYSER

CROSS-REFERENCE TO RELATED APPLICATIONS

The present application claims priority to British Patent Application No. GB 1715182.0 filed on Sep. 20, 2017. The aforementioned application is hereby incorporated by reference in its entirety.

BACKGROUND OF THE INVENTION

Field of the Invention

The field of the invention relates to a device and a scanning method for use in an automated analyser to scan objects or codes on objects.

Brief Description of the Related Art

Automated analyser systems for use in clinical diagnostics and life sciences are produced by a number of companies. For example, the Stratec Biomedical AG, Birkenfeld, Germany, produces a number of devices for specimen handling and detection for use in automated analyser systems and other laboratory instrumentation.

In clinical diagnostics and life sciences automated analysers are used for tasks such as specimen handling, specimen preparation, detection and analysis. Automated scanning systems are used in automated analysers for example for barcode reading and reading of two dimensional codes to identify objects such as receptacles and containers usually containing a sample or reagent.

Due to its relatively small depth of field, a camera system needs to be newly focused or positioned for every object distance to be acquired. In applications wherein a scanning unit, comprising a camera and a deflection mirror, is moved and wherein different object distances are to be acquired, two drives are needed. One drive is needed to adapt the focus level, while another drive is needed to move the scanning unit. It is thus state of the art to use two separate drives, one for focus setting and one providing motion of the scanning unit. Alternatively, a laser scanner with larger depth of field is used in the art.

Published U.S. Patent Application No. US 2001/048029 A1 discloses an automatic apparatus for reading bar codes consisting of a bar code reader, a reflecting member for reflecting light irradiated from the bar code reader to a bar code, a driving means for moving the reflecting member on a travel path parallel to the direction of the irradiated light and at least one abutment part provided on said travel path. A first container setting part for setting first containers and a second container setting part for setting second containers are arranged on both sides, respectively, of said travel path, and the reflecting member may rotate between a first position to allow said bar code reader to read first bar codes of the first containers through the reflecting member and a second position to allow said bar code reader to read second bar codes of the second containers through the reflecting member. It is a disadvantage of the disclosed device that the reflecting ember can omly be orientated to one side and has to be turned for reading bar codes on the opposite side. A further disadvantage is that the distance between reflecting member and bar code reader is fixed so that focusing to objects located in different distances will not be possible.

Published UK Patent Application No. GB 2537887 A teaches a system for identifying a sample container or a reagent container or a rack, the system comprising loading module, a camera, an LED bar comprising at least one LED, at least one mirror, at least one control PCBA and a sledge, wherein the camera or the at least one mirror is mounted on the sledge with the at least one mirror positioned between the camera and the container or rack so that the optical path of the camera is reflected at least once between the camera and the container or the rack to enable the camera to record or film at least one picture or frame of the container or rack as it is inserted into the module. The sledge is motor-driven and moves to position the camera or the at least one mirror. The LED bar is positioned to illuminate the container. Ideally, a motion or proximity sensor detects a user's presence near the loading module so that the system may be activated.

The disadvantages of the prior art using two drives are the complex mechanics, high maintenance costs, a high risk of default, large space requirement and high costs. The disadvantage of using a laser scanner on the other hand is the small range of functions limited to the barcode reading function excluding additional functions such as reading of two dimensional codes, cap detection and others.

SUMMARY OF THE INVENTION

It is an object of the invention to provide a device and a scanning method to scan objects or codes on objects with simple mechanics and a broad range of possible functions for use in an automated analyser.

The instant invention provides a scanning device for use in an automated analyser, the scanning device comprising a camera, a camera slide, a drive unit, one or two deflection mirrors and a deflection mirror mount with an oblong hole, wherein the camera is positioned on the camera slide, the deflection mirrors are mounted on the deflection mirror mount and the deflection mirror mount is connected to the camera slide over the long hole, for adjusting the distance between camera and the one or two deflection mirrors.

It is envisaged that the drive unit comprises a stepping motor and a toothed belt.

The scanning device may further comprise a linear guidance guiding the camera slide.

It is intended that a pre-loading guidance element is each installed at the bottom side of the camera slide and at the bottom side of the deflection mirror mount, such that the bottom sides of the camera slide and the deflection mirror mount comprises a pre-loading guidance element.

It is further intended, that the scanning device further comprises one or two lamps mounted on one or two lamp mounts positioned on the camera slide respectively next to the side of the camera.

The camera of the scanning device may comprise a red filter.

Moreover, the drive unit of the scanning device may further comprise an encoder.

In a further aspect, the device may comprise one V-shaped deflecting mirror with two angled deflecting sides for deflecting bar codes located at opposite sides of the device.

Furthermore, the instant invention provides a scanning method for use in an automated analyser, the method comprising the steps of:

moving a scanning unit comprising a camera positioned on a camera slide and one or two deflection mirrors mounted on a deflection mirror mount with an oblong hole along a linear guidance to a first position with the help of a drive unit, wherein the camera slide is connected to the deflection mirror mount over the long hole for adjusting the distance between camera and the one or two deflection mirrors;

fixing the deflection mirrors at said position;

adjusting the distance between the camera and the fixed deflection mirrors over the long hole to adjust the focus level, by moving the camera with the help of the drive unit;

fixing the camera;

scanning an object and/or an ID code on an object by capturing an image shown on the deflection mirrors with the camera;

processing the captured image.

In another aspect of the invention, the previous steps may be repeated if desired until the last object and/or a code on an object has been scanned.

It is intended that the scanning method for use in an automated analyser further comprises the step of choosing the position in that the deflection mirrors are fixed such that the deflection mirrors catch the image of an object and/or a code on an object.

It is further intended that the scanning method for use in an automated analyser further comprises the steps of fixing the deflection mirrors at said position with a pre-loading guidance element installed at the bottom side of the deflection mirror mount and fixing the camera is fixed with a pre-loading guidance element installed at the bottom side of the camera slide.

The method may further comprise the step of illuminating the object and/or code on the object to be scanned with a lamp mounted on a lamp mount before the scanning step, wherein the lamp mount is installed on the camera slide next to the side of the camera.

It is intended that moving steps are controlled by an encoder.

The method of the invention may further encompass one V-shaped deflecting mirror with two angled deflecting sides being used for deflecting bar codes located at opposite sides of the device Furthermore, it is intended to use the scanning device an automated analyser system for scanning an object or an ID code on an object.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

Figure 1:
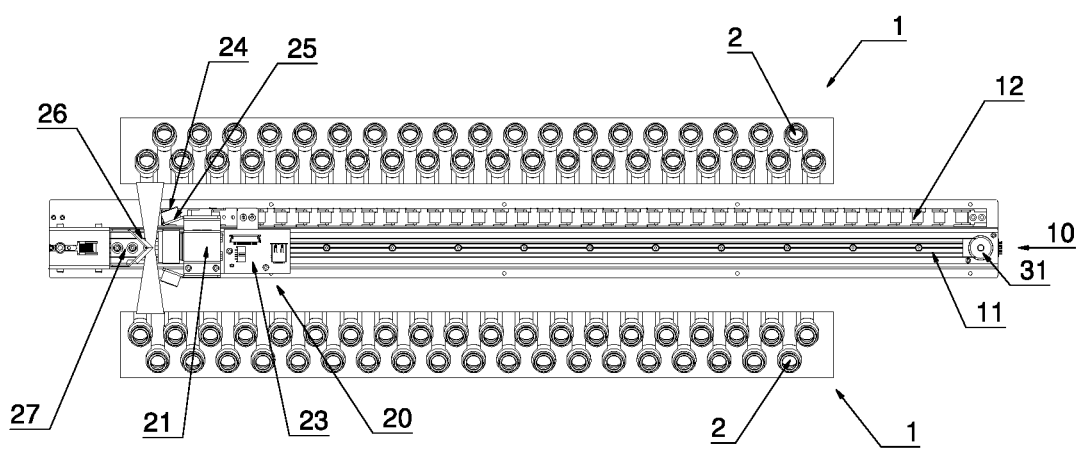
FIG. 1 is a top view of the scanning platform according to the invention.

The technical problem is solved by the independent claims. The dependent claims cover further specific embodiments of the invention.

The invention provides a device and a scanning method for use in an automated analyser, wherein a scanning unit is enabled to move past and in front of an object and set two different focus levels with one and the same drive unit in order to scan objects or codes on objects.

Objects to be scanned include any receptacle suitable for use in automated analysers and may comprise a lid and/or a code. Codes may be chosen from the group comprising but not limited to one dimensional codes such as bar codes and two dimensional codes as for example QR codes, aztec codes and data matrices. Any code may adhere to the object via a label. Receptacles may be chosen from the group comprising but not limited to containers, tubes and bottles. The objects usually contain a sample and/or a reagent. A sample may be liquid or solid and stem from a patient for example. A reagent might be selected from the group comprising but not limited to solvents, aqueous solutions, buffers and other liquids. The reagents may further comprise enzymes, primers, nucleotides, adenosine triphosphates, and/or dyes. Buffers might be without limitation dissolving, washing, neutralizing, stabilizing and/or reaction buffers necessary for performing a chemical reaction.

The invention describes a device and a scanning method for use in an automated analyser, wherein a drive unit, comprising a stepping motor and a toothed belt, moves a scanning unit. The scanning unit comprises a camera, a camera slide, two lamps, two lamp mounts, a deflection mirror mount with an oblong hole, two deflection mirrors and four pre-loading guidance elements. Two of the pre-loading guidance elements are installed on the bottom side of camera slide and the other two pre-loading elements are installed on the bottom side of the deflection mirror mount. The camera is positioned on a camera slide, wherein the camera slide is moved along a linear guidance when driven by the drive unit. Furthermore, two lamps each mounted on a lamp mount are installed on the camera slide next to each side of the camera. The camera may comprise a red filter to be used with appropriate lighting provided by the lamps in order to reduce the influence of the surrounding light and provide uniform conditions, thereby improving and simplifying image processing carried out by an image processing software. The camera is further connected to a cable over the camera slide, wherein the camera slide is connected to a cable guide containing the cable connected to the camera. The cable guide may be an energy chain. The deflection mirror mount comprising the deflection mirrors is connected to the camera slide over the oblong hole. The deflection mirrors mounted on the deflection mirror mount are thus moved together with the camera. The length of the oblong hole is defined over the distance between the two desired focus levels.

The scanning unit and the drive unit are part of a scanning platform further comprising a linear guidance, a cable guide and a sensor for initialization of the axis realized by the moving scanning unit guided by the linear guidance. The scanning platform is positioned between two racks comprising objects to be scanned. The objects are arranged in two rows and staggered to one another so that the objects in both rows can be scanned. The objects are usually receptacles or containers containing a sample and/or reagent. The two deflection mirrors enable scanning of the objects on both sides of the scanning platform.

The scanning method comprises the steps of:
moving the scanning unit along the linear guidance to a first position with the help of the drive unit;
fixing the deflection mirrors at said position;
adjusting the distance between the camera and the fixed deflection mirrors if necessary, by moving the camera with the help of the drive unit;
fixing the camera;
scanning an object and/or an ID code on an object by capturing an image shown on the deflection mirrors with the camera;
processing the captured image;

The positioning can be controlled by an encoder. The position of the deflection mirrors determines at what position in the rack a picture is to be captured and processed. The distance between the camera and the mirror determines the object distance between each mirror and the respective object focused on. When the scanning unit is moved to a new position, it is the deflection mirrors that are positioned in a first step. Once the deflection mirrors are positioned correctly they are fixed over the pre-loading guidance elements. The deflection mirrors are held in position by friction forces between the pre-loaded guidance elements and the linear guidance. If necessary, the camera is then moved on the camera slide to the appropriate distance between deflection mirrors and camera. The oblong hole defines the distance between the two focus levels. The position of the camera is fixed over the pre-loading guidance elements on the bottom side of camera slide.

Alternatively, a larger depth of field can be achieved by using a small aperture and/or a very long focal length of the camera lens. When an aperture is used, effort and price for lighting increase, because much more light is needed. When a longer focal length is used, the installation space is drastically increased. Furthermore, multiple mirrors are possibly necessary to fold the beam, which in turn increases the complexity of the system.

Another alternative to deal with different focus levels is to use a liquid lens to focus the camera. Such a liquid lens can be deformed by the application of a corresponding voltage, thus changing its focal length. Such a liquid lens requires its own drive electronics and in turn increases the complexity and price of the system.

The invention describes a mechanical solution to set two focus levels with one drive only.

The present invention provides a device allowing to focus on bar codes located with a different distance to the mirrors by using the long hole for adjusting the distance between camera and deflecting mirrors. It is to be noted that the use of a V-shaped mirror having to reflecting sides for deflecting bar codes avoids the use of a movable mirror that can be directed to opposite sides.

The advantages of the invention of the present disclosure can be summarized as follows:
a. The invention has simple mechanics
b. The invention has a lower risk of default
c. The invention has a smaller installation space
d. The invention leads to lower costs
e. The camera system of the invention enables for example:
reading of two dimensional codes
container presence detection
container type detection
determination of container dimensions
lid presence detection
lid type detection
fill level detection in the container
detection of code label shedding
detection of a damaged container

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

FIG. 1 shows a top view of the scanning platform 10 according to the invention positioned between two racks 1 comprising objects 2 to be scanned. The objects 2 are arranged in two rows and staggered to one another. The scanning platform 10 comprises a stepping motor 31 positioned at one end of the scanning platform 10, a linear guidance 11 parallel to the racks 1, a cable guide 12 parallel to the linear guidance 11, a sensor is not shown and a scanning unit 20 comprising a camera 21 positioned on a camera slide 23, two lamps 24 mounted on two lamp mounts 25 installed on the camera slide 23 next to each side of the camera 21 and two deflection mirrors 26 mounted on a deflection mirror mount 27. The two lamps 24 are each oriented to the deflection mirrors.

Figure 2:
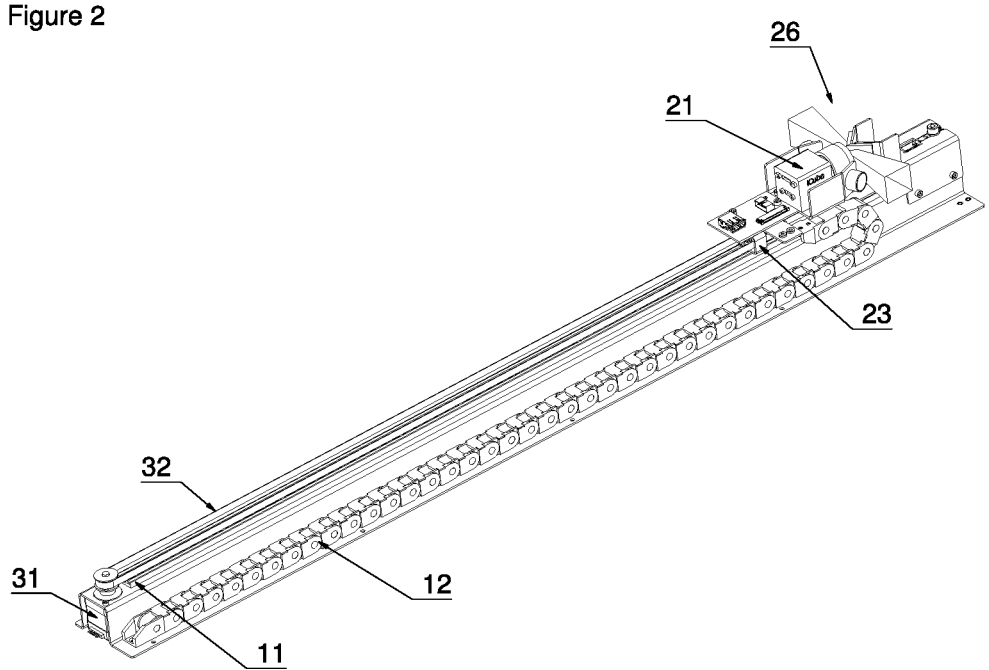
FIG. 2 is a perspective view of the scanning platform.

FIG. 2 shows a perspective view of the scanning platform 10 showing the camera 21 positioned on the camera slide 23 and the two deflection mirrors 26 connected to the camera slide 23, wherein the camera slide 23 is positioned on the linear guidance 11, the stepping motor 31 is positioned at the end of the scanning platform 10 and connected to the toothed belt 32, and the cable guide 12 is connected to the camera 21 over the camera slide 23 and runs parallel to the linear guidance 11.

Figure 3:
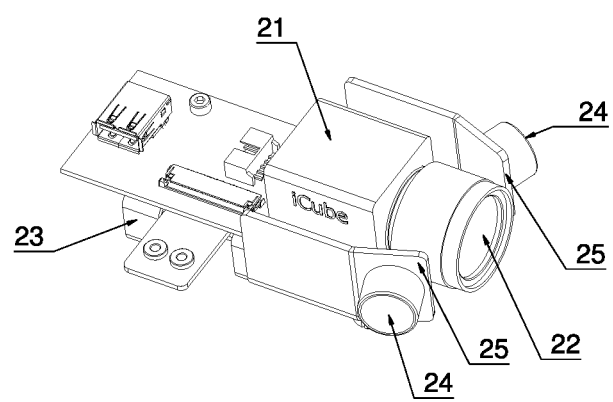
FIG. 3 is a perspective view of the scanning unit without deflection mirrors and mirror mounts.

FIG. 3 shows a perspective view of the scanning unit without deflection mirrors and mirror mounts showing the camera 21 with a red filter 22 positioned on a camera slide 23 comprising two lamps 24 mounted on two lamp mounts 25 positioned on each side of the camera 21.

Figure 4A:
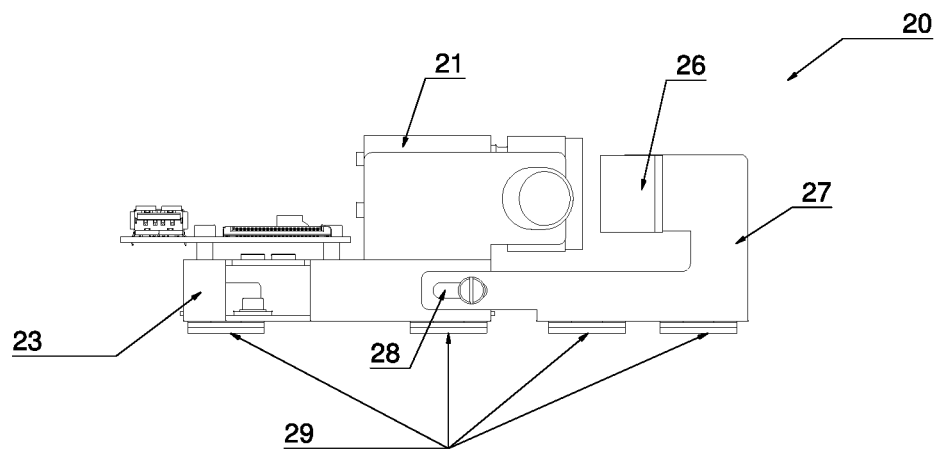
FIG. 4A is a side view of scanning unit adjusted to a first focus level.
Figure 4B:
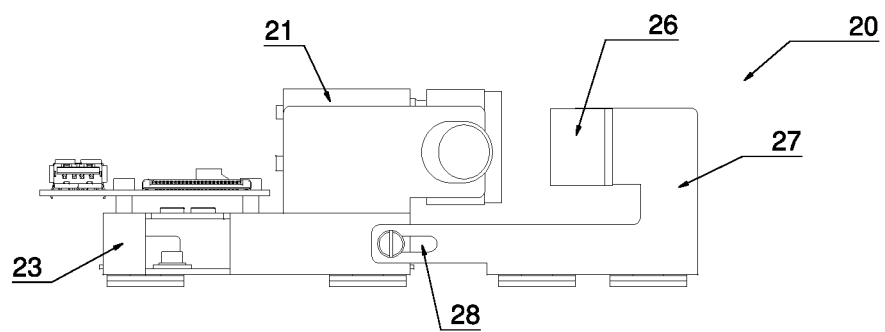
FIG. 4B is a side view of scanning unit adjusted to a first focus level.

FIGS. 4A and 4B show a side view of scanning unit 20 adjusted to two different focus levels, wherein the camera slide 23 is connected to the deflection mirror mount 27 comprising the deflection mirrors 26 over the oblong hole 28. The two different focus levels are characterized by the distance between the camera 21 and the mirrors 26, wherein the oblong hole 28 defines the distance between the two focus levels. Pre-loading guidance elements are arranged at the bottom of the scanning unit 20.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

1 rack
2 object
10 scanning platform
11 linear guidance
12 cable guide
20 scanning unit
21 camera
22 red filter
23 camera slide
24 lamp
25 lamp mount
26 deflection mirror
27 deflection mirror mount
28 oblong hole
29 pre-loading guidance element
31 stepping motor
32 toothed belt

What is claimed is:

1. A scanning device for use in an automated analyser, the scanning device comprising a camera, a camera slide, a drive unit, one V-shaped deflection mirror with two angled deflecting sides and a deflection mirror mount with an oblong hole, wherein the camera is positioned on the camera slide and the V-shaped deflection mirror is mounted on the deflection mirror mount and the deflection mirror mount is connected to the camera slide over the oblong hole, defining the distance between two focus levels between the camera and the V-shaped deflection mirror.

2. The scanning device according to claim 1, wherein the drive unit comprises a stepping motor and a toothed belt.

3. The scanning device according to claim 1, further comprising a linear guidance guiding the camera slide.

4. The scanning device according to claim 1, wherein a bottom side of the camera slide and the bottom side of the deflection mirror mount each comprise a pre-loading guidance element.

5. The scanning device according to claim 1, further comprising one or two lamps mounted on one or two lamp mounts, respectively, positioned on the camera slide respectively next to the side of the camera.

6. The scanning device according to claim 1, wherein the camera comprises a red filter.

7. The scanning device according to claim 1, wherein the drive unit further comprises an encoder.

* * * * *